(12) United States Patent
Tether

(10) Patent No.: US 7,482,767 B2
(45) Date of Patent: Jan. 27, 2009

(54) REGENERATIVE MOTOR PROPULSION SYSTEMS

(75) Inventor: David Eugene Tether, Palm Harbor, FL (US)

(73) Assignee: Solomon Technologies, Inc., Tarpon Springs, FL (US)

( * ) Notice: Subject to any disclaimer, the term of this patent is extended or adjusted under 35 U.S.C. 154(b) by 91 days.

(21) Appl. No.: 11/046,533

(22) Filed: Jan. 28, 2005
(Under 37 CFR 1.47)

(65) Prior Publication Data
US 2006/0175996 A1    Aug. 10, 2006

Related U.S. Application Data

(60) Provisional application No. 60/539,978, filed on Jan. 30, 2004.

(51) Int. Cl.
*H02P 3/14* (2006.01)
(52) U.S. Cl. .................. 318/139; 318/376; 318/154
(58) Field of Classification Search .......... 318/139, 318/153, 154, 158, 161, 375, 376
See application file for complete search history.

(56) References Cited

U.S. PATENT DOCUMENTS

| | | | | | |
|---|---|---|---|---|---|
| 4,095,153 | A | * | 6/1978 | Matty et al. .............. | 318/376 |
| 4,319,177 | A | * | 3/1982 | Kawada et al. .............. | 318/798 |
| 4,547,678 | A | * | 10/1985 | Metzner et al. .......... | 290/40 C |
| 5,390,992 | A | * | 2/1995 | Walenty et al. .............. | 303/112 |
| 5,789,882 | A | * | 8/1998 | Ibaraki et al. .............. | 318/148 |
| 5,861,724 | A | * | 1/1999 | Ackerson .............. | 318/376 |
| 5,898,282 | A | * | 4/1999 | Drozdz et al. .............. | 318/139 |
| 5,932,815 | A | | 8/1999 | Dodds | |
| 6,176,556 | B1 | * | 1/2001 | Kizer .............. | 303/152 |
| 6,177,773 | B1 | * | 1/2001 | Nakano et al. .............. | 318/376 |
| 6,194,802 | B1 | | 2/2001 | Rao | |
| 6,308,649 | B1 | | 10/2001 | Gedeon | |
| 6,367,270 | B2 | * | 4/2002 | Niimi et al. .............. | 62/133 |

(Continued)

FOREIGN PATENT DOCUMENTS

GB        472 472 A        9/1937

OTHER PUBLICATIONS

International Search Report for PCT/US2005/002561, mailed Aug. 16, 2005.

*Primary Examiner*—Bentsu Ro
(74) *Attorney, Agent, or Firm*—Nutter, McClennen & Fish, LLP

(57) ABSTRACT

A vehicle or watercraft regeneration system includes at least one electric motor capable of generating electricity and a controller for the at least one motor; wherein the controller to optimize the efficiency of the regeneration. The controller can optimize efficiency by including comprises circuitry for biasing the electric motor during regeneration. Also provided is a regeneration system that further comprises an electricity storage device such as a battery, a capacitor, an electrolysis unit that generates hydrogen from water, and a flywheel. In addition, an efficiency enhancing system for a watercraft or vehicle includes at least one electric motor capable of generating electricity; a controller for the at least one motor; and an electrical connection between the at least one motor and the controller, where in the controller adjust one or more magnetic fields of the electric motor during regeneration to optimize the efficiency of the regeneration. Methods for increasing efficiency of regeneration of a watercraft of vehicle powered by at least one electric motor are also disclosed.

19 Claims, 5 Drawing Sheets

U.S. PATENT DOCUMENTS

| | | | |
|---|---|---|---|
| 6,367,570 B1 * | 4/2002 | Long et al. | 180/65.2 |
| 6,645,017 B1 | 11/2003 | Skrzypek et al. | |
| 6,659,815 B2 * | 12/2003 | Motsenbocker | 440/1 |
| 6,664,651 B1 | 12/2003 | Kotre et al. | |
| 6,686,719 B2 * | 2/2004 | Cochoy et al. | 318/801 |
| 6,699,081 B1 * | 3/2004 | Divljakovic et al. | 440/1 |
| 6,734,645 B2 * | 5/2004 | Auerbach | 318/139 |

* cited by examiner

REGENERATIVE MOTOR PROPULSION SYSTEMS

RELATED APPLICATIONS

This application claims priority to U.S. Provisional Application Ser. No. 60/539,978, filed on Jan. 30, 2004 and entitled "Regenerative Motor Propulsion Systems," which provisional application is incorporated herein by reference.

FIELD OF THE INVENTION

The invention relates generally to electric motor and generator control and more specifically to electrical power regeneration in vehicles such as automobiles and watercraft.

BACKGROUND

Energy efficiency has become an important factor in electric transportation machines. A particularly good technique for improving overall efficiency in this field is regeneration. Regeneration may involve converting kinetic energy of a vehicle (such as a car, truck, bus or watercraft) into stored electrical energy. In many instances, an electric motor converts electrical energy into kinetic motion, and the same motor, when operated as a regenerator, converts kinetic energy back into electrical energy. The electric energy typically is stored for example, in a capacitor bank, battery, or flywheel, for later re-use.

A good example of a motor/generator that alternately powers a vehicle and regenerates electricity is the Electric Wheel™, commercialized by Solomon Technologies Inc. of Tarpon Springs, Fla. As described for example in U.S. Pat. No. 5,863,288 entitled "Method and apparatus for propelling a marine vessel," U.S. Pat. No. 5,851,162 entitled "System and apparatus for a multiple input and dual output electric differential motor transmission device," and U.S. Pat. No. 5,575,730 entitled "Multiple-input infinite-speed integral motor and transmission device," an embodiment of David Tether's invention operates by, among other things, combining mechanical energy with electric energy obtained through a permanent magnet motor. This technique is useful for a variety of applications. For example, the Toyota Prius, a popular hybrid automobile has adopted a ring gear system that, for a time combines the mechanical system used by the Electric Wheel with the output of a motor for propelling a car and regenerates energy during braking.

Regeneration, as described in the Solomon Technologies' patents and as followed by automakers such as Toyota, likely will become more dominant in the transportation industry. This technique often is used under a variety of motor conditions such as motor speed and loading. However, the motor/generator efficiency generally changes with operating condition. Accordingly, any method or device that compensates or mitigates the mismatch can lead directly to efficiency improvements. Another problem is that, while regeneration for land vehicles such as golf carts, cars and buses has been well implemented, regeneration for watercraft is in contrast much less developed. Accordingly, any tool that provides regeneration for watercraft should be a boon to this industry.

SUMMARY OF THE INVENTION

An object of an embodiment is to provide improved fuel economy. Another object according to an embodiment is to provide improved use of equipment such as motors, sails, propellers, transmissions and batteries. Yet another object is to harvest energy from a naturally occurring source such as wind, waves, potential energy of a vehicle at a higher elevation traveling to a lower elevation, and kinetic energy obtained from a braking vehicle. Yet another object is to obtain improved overall transportation efficiency of watercraft with a system that integrates information about boat speed and one or more other parameters such as wind speed, sail use, and wave action, to adjust motor power.

These and other objects can be met by embodiments as described here in. One embodiment provides a vehicle or watercraft regeneration system, comprising at least one electric motor on a vehicle or watercraft capable of generating electricity; and a controller for the at least one motor; wherein the controller comprises circuitry for biasing the electric motor during regeneration to optimize the efficiency of the regeneration. Another embodiment provides a regeneration system that further comprises an electricity storage device such as a battery, a capacitor, an electrolysis unit that generates hydrogen from water, and a flywheel. Yet another embodiment provides an efficiency enhancing system for a watercraft or vehicle, comprising at least one electric motor capable of generating electricity; a controller for the at least one motor; and an electrical connection between the at least one motor and the controller, where in the controller adjust one or more magnetic fields of the electric motor during regeneration to optimize the efficiency of the regeneration. Yet another embodiment provides a method for increasing efficiency of regeneration of a watercraft of vehicle powered by at least one electric motor, comprising, sensing when a regeneration event will occur; activating one or more electric motors to place the one or more motors in a more efficient state of regeneration; and regenerating electricity.

Yet another embodiment provided a method of increasing regeneration efficiency of a sail boat that comprises a motor/generator, comprising: monitoring at least wave activity, wind activity, boat attitude, boat speed, and motor speed to generate one or more signals, determining a down wave condition suitable for a regeneration event from the one or more signals, and biasing the motor/generator before or during the down wave condition for enhanced regeneration performance. Still another embodiment is a sail boat regeneration system comprising: a motor—generator coupled to a propeller, a controller electrically connected to the motor—generator, the controller comprising circuitry for biasing the motor/generator, to improve regeneration efficiency. Yet another embodiment is a method of increasing regeneration efficiency of a sail boat that comprising, a motor/generator, comprising, monitoring at least one wave activity, wind activity, boat speed, boat attitude, and motor speed to generate one or more signals, determining a down wave condition suitable for a regeneration event from the one or more signals, and biasing the motor—generator before or during the down wave condition for enhanced regeneration performance.

BRIEF DESCRIPTION OF THE DRAWINGS

The invention will be more fully understood from the following detailed description taken in conjunction with the accompanying drawings, in which.

DETAILED DESCRIPTION OF THE PREFERRED EMBODIMENTS

Figure 1:
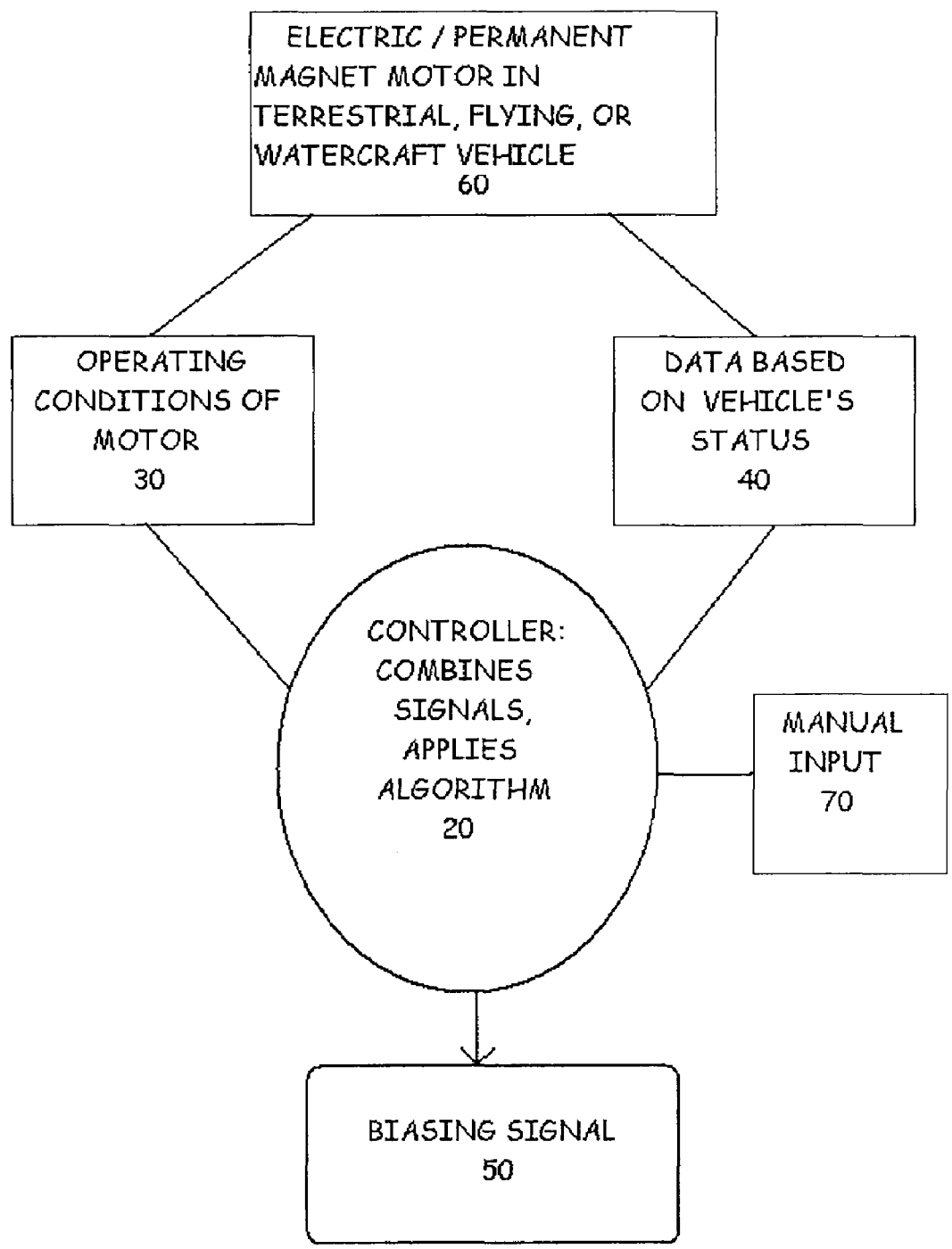
FIG. 1 shows an embodiment for a controller which generates a biasing signal to be applied to an electric motor.

Methods, systems, materials and algorithms were discovered that enhance regeneration efficiency. In one embodiment a bias is applied to an electric generator (or dual use motor/generator) to alleviate internal friction forces and provide improved regeneration. In a desirable embodiment this occurs at a low rotational shaft speed below the designed optimum speed of the generator. In another embodiment where a motor/generator alternately powers and regenerates a vehicle such as a watercraft, the powering motor rpm is adjusted prior to switching over to regeneration, for improved overall performance.

A wide variety of vehicles and conditions of their use are contemplated for embodiments. For example, a propeller driven airplane may convert kinetic energy of propeller movement, when descending altitude, into electrical energy for heating a carburetor, heating wing surfaces or for charging a battery or other storage device. An automobile, truck, fork lift, or golf cart, upon descending a hill, releases potential energy and, while slowing or braking, releases kinetic energy. In such instances, a regenerating motor can convert the mechanical energy into electric energy, and thereby improve efficiency of energy usage. It was found that adjusting the rpm of the motor, and/or adjusting one or more magnetic fields of the motor before and/or during such a regeneration event can enhance efficiency in such situations.

Regeneration for watercraft particularly is contemplated in the context of, for example, recovering energy from wave activity, wind activity, and watercraft deceleration. In an embodiment, a propulsion motor-regenerator is used to motor up a wave and the same motor as a generator harvests energy from the watercraft's travel back down a wave. In other representative embodiments, judicious use of the motor-generator allows more efficient travel by maintaining a more fully used sail, a more efficiently used power supply, and/or a more efficient use of motor speed to match a particular hull and loading conformation of the watercraft.

Regeneration motors, their biasing, control systems, sensors for implementing control, and exemplified operation in vehicles such as watercraft are described next. A skilled artisan will appreciate that the described devices, methods and their use may be employed with a wide variety of motors, generators, and motor-generators in a large variety of vehicles such as airplanes, vehicles such as cars, buses, trains, wind mills, fork lifts, bicycles, golf carts, watercraft, and even stationary devices such as elevators and conveyors. Each device, method, system, and algorithm described herein specifically is contemplated for use in each of the other applications and space limitations preclude an exhaustive description of applications in these other areas. Furthermore, a wide variety of motors, controllers, manual operation controls and systems, automatic sensors, algorithms and control systems also are contemplated in embodiments. Such equipment, systems and methods may be built into new equipment or added to existing equipment as upgrades or conversion kits. Computer and/or other microprocessor control systems that utilize one or more manual and/or sensor inputs further may be used in embodiments. A skilled artisan readily will appreciate yet further embodiments upon a reading of the specification.

Motors for Regeneration

A wide variety of motors are contemplated for embodiments. In a desirable embodiment, a regenerative motor propulsion system ("RMPS") is employed that uses a motor that also regenerates by occasionally shifting from electricity consumption to electricity production. Included within this group are propulsion motors. Any motor can be used as a propulsion motor and representative examples are described here. Brushless DC motors such as single or dual brushless motors on a single shaft are particularly desirable. For example, the Electric Wheel™, commercialized by Solomon Technologies, is particularly desirable in this regard. Most desirable are direct drive motors coupled to propellers via shafting, sail drives and pod drives. Other examples include small motors tunneled into boat hulls that are used as thrusters, submarine motors connected large slow spinning (e.g. normally less than 2000 rpm) propellers, and aircraft motor (including internal combustion powered) driven propellers that are mechanically coupled to electric generators.

Permanent magnet motors are particularly desirable although motors that lack permanent magnets, such as many AC induction motors, also are useful and may become more common as prices of high power electronic control devices continue to drop. DC motors, such as trolling motors, electric outboard motors, inboard motors, electric car motors, hybrid car and truck motors and starter motors are very useful and in many cases can be switched into regeneration easily. AC induction motors such as shaded pole, split phase, capacitor start, two value capacitor, permanent split capacitor, two phase, three phase star, three phase delta, and three phase single voltage types may be used. Most advantageously, however, is the use of a permanent magnet brushless motor such as the type commercialized by Solomon Technologies.

In a desirable embodiment the motor is directly coupled to a moving energy conversion device such as a boat propeller, airplane propeller, wheel of a car, bus, truck or train, wheel of a conveyor, and the like. A transmission may also be used. While an embodiment emphasizes the use of a motor in a dual use for regeneration, one or more motors may be connected directly or indirectly to one or more generators. The connection may be direct, or may be mediated via a transmission, clutch and/or other coupler. The one or more generators may be adjusted as described herein for a combination motor/generator and specifically are included as embodiments of the invention. Furthermore, one or more motor-generators may be coupled together. Embodiments, such as biasing techniques, control techniques, sensing techniques, systems and algorithms used in their operation described herein for RMPS based on dual use of a motor as a generator also apply to dedicated generators and their systems, as a skilled reader readily will comprehend.

Biasing the Regenerating Motor or Motor/Generator

Virtually every type of vehicle is or can be powered by one or more electric motors such as those summarized above. One advantage of doing so, in many instances, is that many electric motors can recapture energy by regeneration. Unfortunately, however, motors and generators generally are designed with a particular optimum set of conditions and work best at a given shaft rpm speed and load. An embodiment of the invention alleviates this problem by biasing the motor or generator at other, less optimum shaft speeds or conditions to compensate for internal friction.

In an embodiment, a generator or motor/generator is biased, for example, by imparting one or more pulses of current, a varying current, and/or a constant but altered current level. For example, one or more field coils may be energized or adjusted to affect a different magnetic field when generating electricity compared to the electrical situation when used as a motor. In an embodiment, one or more electromagnets are used together with one or more permanent magnets to produce a combined field.

In an embodiment, a permanent magnet motor is improved by the addition of one or more field coils that generate magnetic field(s) that complement (e.g. add to or subtract from) the existing permanent magnetic field(s). The electromagnets in this way provide a more optimized field depending on circumstances. Without wishing to be bound by any one theory for the operation of this embodiment, it is believed that a permanent magnet motor often has a permanent magnetic field strength chosen for a given circumstance of operation, such as a given rotation rate and/or load. However, at other conditions, such as at other speeds, other loads, during use as a generator instead as a motor, and the like, the chosen permanent magnet(s) field(s) are less optimum and may even form increased magnetic attractions within the motor at low speed. In an embodiment, one or more field electromagnets are energized to add to and/or to subtract from an existing field to improve efficiency during regeneration, during motor use at a particular speed range or loading such as at low speed, and the like. By applying a reverse electromagnet field, a permanent magnet field may be weakened. Reversing polarity of the electromagnet circuit allows strengthening of the permanent magnetic field in such embodiment.

In a desirable embodiment for regeneration in the watercraft field, a motor/generator may shift rapidly between a motor function of generating a mechanical force from electrical energy, and a generator function of creating electrical energy from mechanical energy. For example, a motor/generator, when directly or indirectly connected to a boat propeller, may provide kinetic energy to a boat when used as a motor through at least part of a wave cycle, or a time during which the boat travels up a wave and down a wave. While traveling down, or perhaps at the crest of the wave, the motor switches into regeneration mode for at least part of the down cycle. In switching between motoring and generation, inherent motor/generator efficiency may be compromised. For example, the motor shaft rotation rate at the beginning of a regeneration cycle (i.e. end of a motoring cycle) may not be ideal for optimum regeneration efficiency. Furthermore, when the regeneration time is short, the starting rpm can affect the average rpm during the regeneration cycle. In such instances, adjusting the generator as described herein may improve regeneration efficiency.

In a particularly desirable embodiment, a motor generator or regenerative motor propulsion system is provided that switches between regeneration and propulsion within the time of 0.5 revolutions of the motor/generator shaft. In another embodiment, switching from regeneration to propulsion, or back, occurs within 1, 2, 3 or more revolutions. In an electric or electric hybrid land vehicle embodiment, a controller is informed by a brake signal, which may be from a deceleration sensor, foot brake signal or the like.

Typically, a shift into regeneration mode is accompanied by application or modification of a bias. The amount and type of biasing can be determined empirically by a skilled artisan. In this context, and without wishing to be bound by any one theory for operation of RMPS, it is pointed out that regeneration from a motor commences when external rotating force is greater than internal friction or drag forces of the motor. Furthermore, the internal forces of the motor more often than not reflect an optimized design for operation as a motor at a given speed or range of speeds, and not necessarily for operation as a generator at all speeds. Analogously, a dedicated generator generally may be desired for some situations at one speed, and can benefit from a biasing technique as described herein, when used at another, less optimum speed. Still further, the internal force(s) may not necessarily be constant throughout a revolution but may differ throughout the cycle. That is, multiple pulses throughout a single rotation cycle are desirable, in an embodiment. The pulses coincide with poles that line up with the motor.

Biasing may be provided to a motor to improve efficiency in a number of ways. Biasing for example, may be applied as an electric current to the armature, where a brushed or commutated armature is used. Biasing may be applied to a field surrounding an armature or to both armature and field. Biasing, or adjustment of magnetic field, also may be carried out mechanically. In an embodiment, two or more devices are attached to a common shaft such that a rotational force from one device can be applied to another device to help overcome internal friction. Transfer of mechanical energy from one motor to another connected device may facilitate improved efficiency for use of the latter as an electricity generator.

Mechanical adjustment of magnetic field also may be carried out by adjusting the distance between magnets. A small change in distance between magnets can yield a big change in effect because magnet field strength varies by a higher power (typically a cube) of the distance. It is specifically contemplated that this spacing be adjusted during regeneration in order to alleviate internal forces as needed for efficient regeneration. The spacing may be adjusted mechanically by, for example, a screw mechanism, and desirably electromagnetically, by, for example, a solenoid, or by piezoelectric bending of a positioning metal, for a quick and measure change in magnet position. See, for example, the adjustable air gap techniques described in U.S. Pat. Nos. 6,348,751 and 6,137,203, issued to New Generation Motors, which are specifically incorporated by reference.

The internal friction of a motor/generator may be fairly constant over the course of a revolution and a bias may be pulsed for a portion of that revolution, for a complete revolution or during multiple revolutions. If impressed over multiple revolutions, one or more sensing inputs may be used to monitor rotation rate, power or current applied, power or current produced, and/or another parameter and used to modify the biasing. For example, when biasing a golf cart, car, truck, airplane, bus or watercraft that is slowing from a high speed, the amount of bias (typically determined as a current) may be minimal or non-existent at first during high speed, but at lower speeds such as 5% less, 10% less, 25% less, 50% less, 75% less, 90% less or lower, a bias may be increased or initiated to overcome internal friction as appropriate. Generally, a controller may monitor vehicle speed and/or motor rotational speed when deciding to start or to modify the bias. Biasing of a watercraft that regenerates from wave action in many cases may be more complicated and the bias advantageously is informed by other parameters such as wave information, wind information, sail fullness information and state of charge of the batteries or other energy storer.

In an embodiment, biasing is affected by the impressed torque on the motor/generator shaft by an outside force such as wave motion on a propeller or braking motion from wheels. A sensor such as a motor current detector, motor voltage detector, speed sensor, or event recorder such as a microprocessor detects the level of impressed torque and sets the bias (or adjusts an existing bias) accordingly. For example, a low torque force may require a larger bias to overcome internal friction, while a higher torque force may need decreased bias as the higher torque more readily overcomes the internal friction. In another embodiment, however, the "bias" is a magnetic field that is actually increased with a braking torque, in order to present a stronger resistance to braking. For example, a sudden braking of a hybrid land vehicle may call for a big magnetic field surrounding the motor/generator armature in order to accommodate the large braking force.

Figure 3:
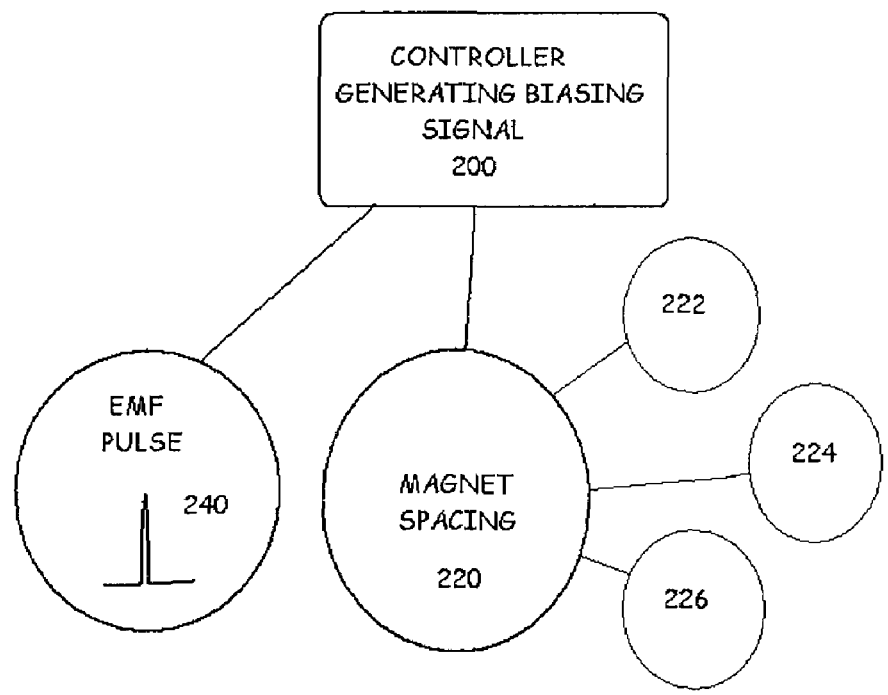
FIG. 3 shows a representation of exemplary ways in which the biasing signal of FIG. 1 can be applied to the electric motor.

In an embodiment, a motor's internal friction is diminished by application of at least one pulse to one or more electromagnets of a motor/generator. A bias pulse may be of any size, time duration and periodicity as may be determined for a particular motor/generator. In an embodiment shown in FIG. 3, a pulse 240 has a duration of between 1 microsecond and 1 minute, desirably between 1 millisecond and 2 seconds, and more desirably between 5 milliseconds and 500 milliseconds. In an embodiment the magnitude of the pulse, expressed as power in watts, is between 1% and 10,000%, desirably between 5% and 2,000% and more desirably between 25% and 500% of the normal continuous power rating of the motor.

The bias pulse may be a direct current and may be switched in the shape of a square wave, sinusoidal wave, or other wave shape. Due to inductance and resistance of the motor coil(s) and associated circuitry, the actual pulse may be any of a wide range of shapes, such as sinusoidal, trapezoidal, triangular, or an irregular shape. In an embodiment, the pulse is a series of shorter pulses. Instead of a pulse, the bias may be in the form of a continuous or variable current. The continuous or variable current may be modulated according to motor rotational speed, position in a cycle, load, and/or other parameter. In an embodiment, the current periodically varies according to rotation rate. In another embodiment, the current varies as a pulsed direct current and/or as an alternating current over 10 hertz, 100 hertz, 250 hertz, 750 hertz, 1500 hertz, 3000 hertz, 5000 hertz, 10,000 hertz, 20,000 hertz or more.

The bias may be switched (or modulated) at approximately (i.e. within plus or minus 10% of) or about (i.e. within plus or minus 50% of) 1×, 2×, 3×, 5×, 10×, 25×, 50×, 100×, 250×, 500×, 1000× or more of the motor rotational speed. In a desirable embodiment, the bias is modulated or switched at a frequency equal to the rotational speed times the number of: i) motor poles; ii) half the motor poles; iii) twice the motor poles; or IV) another multiple or fraction of multiple of the motor poles. According to an embodiment, the internal resistance of a motor-generator reaches multiple peaks during a single rotation due to the use of multiple magnets that form magnetic nodes during the revolution. For example, 12, 18, 20, 22, 24, 26, 28, 30, 32, 34, 36, 38, 40, 42, 44, 46, 48 or more nodes may exist in the motor that correspond to magnet nodes. A periodic bias corresponding to node number desirably is impressed to coincide with the nodes, to facilitate movement and/or to smooth out the rotation.

In an embodiment the motor/generator may be activated, modulated or otherwise controlled as a motor prior to or during a regeneration event to improve efficiency as a generator. Such control can include, among other things, providing a bias to a motor/generator that allows the motor/generator to rotate more freely in an electricity generation mode. The control also may include conditioning the motor/generator speed prior to (preferably within 2 minutes, 1 minute, 45 seconds, 30 seconds, 20 seconds, 15 seconds, 10 seconds, 8 seconds, 5 seconds, 3 seconds, 2 seconds, 1 second, or within 0.5 seconds) entering a regeneration mode. One type of conditioning in this respect is to increase motor/generator rotation speed so that when the motor/generator enters regeneration, the motor shaft revolves at a higher speed to allow greater regeneration efficiency. In an embodiment, motor speed is increased by increasing power or otherwise increasing the rpm prior to regeneration mode. In another embodiment, a transmission is used to shift the motor or generator shaft rotation speed into an rpm band that is more suitable for regeneration. In an embodiment the motor/generator is used briefly as a motor during regeneration (e.g. during travel down an ocean wave for a watercraft) to increase shaft speed before switching back to regeneration mode.

Shaft speed control may be implemented separately or at the same time as a bias, for enhanced regeneration efficiency. For example, shaft speed may be increased or decreased prior to switching over to regeneration mode, and a bias may be applied during the switch over or afterwards, as desired to improve regeneration efficiency. During regeneration, motor/generation speed, power output, current output, voltage output, temperature, and/or change in rate of any of these may be monitored separately or in combination. Information obtained from monitoring may be stored in computer memory, stored in long term (e.g. magnetic or optical medium) memory, stored in short term memory and/or displayed to the user. This information may be used to select, manually or automatically a particular bias, a change in shaft speed, or another condition useful for improving regeneration efficiency.

Control of Biasing

As shown in FIG. 1, Motor biasing 50 may be set or controlled by a variety of procedures and devices as will be appreciated readily by a skilled artisan. Control may be asserted by direct manual selection 70 as well as by automatic or semi automatic (partly user decision, part sensor based) control systems 30, 40. Manual and automatic selections can be implemented with software, firmware, electronic feedback circuits, manual switches and the like. Manual control 70 may be asserted by one or more of a switch, toggle switch, push button switch, lever, wheel, computer keyboard, touch screen foot switch a pedal operated switch, a voice operated switch, or a radio signal or light signal under control of a user, any computer based switch, a body movement or via sensor output such as from a wave sensor, speed sensor, direction sensor wind sensor, sail status sensor, a speed control with a set position that engages regeneration when a certain minimum or maximum setting is passed.

In a desirable embodiment shown in FIG. 1, regeneration biasing 50 is informed by data 30, 40 of a vehicle's status such as change in vehicle speed, wind, waves, or motor speed. One or more of such status signals may be used in real time and/or in combination with stored information from a stored program such as from a micro controller or computer 20. Example of useful signals 30, 40 include: sensing of a braking signal from a throttle movement, release of a throttle, activation of a brake, activation of a speed control lever or switch, electrical power loss, decrease in available electrical power, a battery status signal, a change in battery status, a change in fuel cell status, a status or change in status of a fuel cell chemical power reservoir, a temperature or change in temperature, a motor speed or change in motor speed, a generator speed or change in generator speed, a change in motor/generator speed, an attitude indicator (such as an indication of a down hill heading) or change in attitude indicator, an elevation or change in elevation, a vehicle speed or change in vehicle speed a wind speed or change in wind speed, a wave speed, a change in wave speed, a wave direction or change in wave direction, a wind direction a change in wind direction, a sail furling state signal, a deceleration or acceleration signal, an electrical signal input by a user, a computer output obtained from operation of a stored program, a piezoelectric generated signal, a distance indication, a light indicator, a sound indicator, a vibration indicator, a motor or generator or motor/generator efficiency measurement or calculation, and or a radio signal.

One or more sensors may be used in a control system 20, as shown in FIG. 1. Such sensors may include for example, wind speed sensors, paddlewheel watercraft speed sensors, gimbal based watercraft attitude sensors, voltage sensors for detecting electric motor rotation rate, magnetic or optical shaft sensors for detecting motor rotation rate, sonic sensing to measure waves, piezoelectric sensing for measuring acceleration, pitch or roll from wave activity and the like. One or more signals 30, 40 from a sensor may be input into a stored program of a microprocessor or other computer 20 and used to control directly or indirectly a motor, generator and/or motor/generator 60.

Algorithms useful for using collected information to control biasing of a motor, generator and/or motor generator for a given application such as a watercraft, land vehicle, air vehicle, or other device readily will be appreciated by a skilled artisan. Combinations of devices that generate such information with components for achieving regeneration specifically are contemplated as embodiments. Representative examples of such devices and their use in vehicle are reviewed next.

Controllers for Biasing

Automatic or semiautomatic control may employ one or more algorithms implemented by a microprocessor such as those reviewed above, that executes a stored program. The controller may be, for example, a dedicated computer, or a microprocessor imbedded in a motor, /generator, a vehicle, a part of a vehicle such as a vehicle such as a steering wheel, dashboard, or instrument panel. The controller may be at a separate location and control regeneration in a separate vehicle or other apparatus via a radio link, wire, optic link or other link.

The controller may have one or more inputs that accept user commands, and optionally additional data such as sensing of a braking signal from a throttle movement, release of a throttle, activation of a brake, activation of a speed control lever or switch, electrical power loss, decrease in available electrical power, a battery status signal, a change in battery status, a change in fuel cell status, a status or change in status of a fuel cell chemical power reservoir, a temperature or change in temperature, a motor speed or change in motor speed, a generator speed or change in generator speed, a change in motor/generator speed, an attitude indicator (such as an indication of a down hill heading) or change in attitude indicator, and elevation or change in elevation, a vehicle speed or change in vehicle speed, a wind speed or change in wind speed, a wave speed or change in wave speed, a wave direction or change in wave direction a, wind direction, or change in wind direction, a deceleration or acceleration signal, an electrical signal input by a user, a computer output obtained from operation of a stored program, a piezoelectric generated signal, a distance indication, a light indicator, a sound indicator, a vibration indicator, a motor or generator or motor/generator efficiency measurements or calculation, and or radio signal.

In an embodiment a motor/generator is controlled by a controller with one or more (e.g. one, two, three, four, five, six, seven, eight, nine, ten or more) sensors that input information to inform a stored program for automated operation of the motor/generator. A wide variety of sensors may be used. For example, signals from piezoelectric device(s) may be input into a controller to sense deceleration, acceleration and/ or vibration. Sensors that detect wind speed, wind direction, wave speed, wave direction, and temperature are will known and can be used separately or in combination with each other by input of information into one or more controller. Optic, piezoelectric, sound, light, and/or other sensors can detect information relating to the state of a sail on a sail boat and thereby help inform a controller when a sail on a sailboat is not being used optimally. Wave activity maybe measured with one or more of an attitude detector, conductivity detector and motor power detector.

Figure 2:
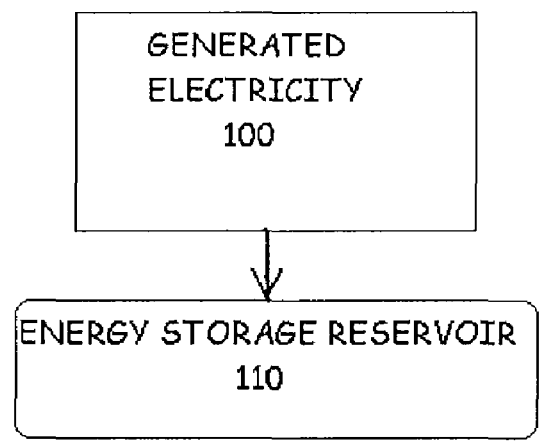
FIG. 2 shows an embodiment for an energy storage device configured for storing energy generated during motor regeneration.

By way of example, a controller may monitor the power consumption (e.g. current, wattage, voltage, impedance, measured magnetic field etc.) of a motor on a watercraft, and thereby detect a periodic slowing down and speeding up of motor speed caused by wave activity. The controller can adjust the timing and type of biasing of a generator and/or motor/generator based on this information. For example, data of a complete wave cycle may be input into a table for modeling. The table, of expected wave activity may be modified with new data and provide and expected duration of a wave down cycle and expected effect on shaft speed. Based on this table, the controller may control the motor to obtain a shaft speed within a range at the expected time of shifting from powering into regeneration. In an embodiment, a controller for a hybrid vehicle such as a hybrid car, hybrid SUV, or hybrid truck records the braking behavior or the driver and modifies the bias that is applied during subsequent braking events. In an embodiment shown in FIG. 2 a short term energy storage reservoir 110 (e.g. capacitors, batteries, and flywheel) acquires energy 100 from braking for use in subsequent acceleration. A controller monitors the braking and the acceleration history of a driver or of the vehicle. The controller resets the proportion of energy 100 sent to the short term energy storage reservoir 110 based on that behavior. For example, a vehicle that experiences hard and/or prolonged acceleration may reset its regeneration braking for more optimum conditions to just fill up or almost (e.g. between 80%-95%) fill up the reservoir 110. A controller may modify the proportion of regeneration energy 100, energy that is sent to the energy reservoir 110 versus longer term electrochemical (e.g. recharge battery or conversion of water into hydrogen and oxygen for a fuel cell). The proportion of energy 100 sent to long term storage (or even used to generate heat) can be decided to optimize the amount for subsequent acceleration.

In another embodiment, movement of a truck, car, aircraft, bus, golf cart or other vehicle down an incline or elevation is sensed by one or more of an attitude sensor, altitude sensor, motor power change monitor (for example a subroutine in a stored program that monitors motor power versus speed), motor speed sensor, vehicle speed sensor, vehicle speed versus power monitor, and the like. The movement of a golf cart or car that continues to move after removal or decrease of motor power can be sensed. The sensed signal may be used by a controller to trigger a regeneration event, a biasing of a regeneration event, and/or the like.

For example, a sensor that detects a downhill decline may alter a regeneration system for heavy braking by setting the motor/generator or by biasing (such as increasing a field magnetic strength) for a heavy braking event. In the latter case, the bias is not designed to overcome friction, but instead to increase a motor torque constant or other feature to allow more absorption of energy by the motor for braking.

Land Vehicle Applications

Embodiments may be used for regeneration in land vehicle. For example, a golf cart that travels down a hill can generate electrical energy by using the motor as a generator. The generator may be used as a brake, and implement an algorithm as described above. According to an embodiment, an electromagnetic field is biased by the application of electric current to provide a higher efficiency for regeneration. For examples, a current to a field coil; armature or both may be altered or impressed as needed to increase generator efficiency. In an embodiment, a feedback circuit directly or indirectly monitors the effect of the biasing and informs a bias controller of the state of the motor. For example, if the motor/generator goes below or above a certain rotational speed or speed range, the controller senses the change and can modify the biasing accordingly. In another embodiment, the current is increased to increase the magnetic field surrounding an armature for enhanced braking.

A proportional controller may adjust the bias by continuously comparing the rotational speed and/or load on the motor. By continuously altering the bias with respect to a change in speed, load, or other sensed condition, higher efficiency may be achieved over a range of speeds. In an embodiment, where a speed control such as a foot pedal is released to stop acceleration or for slowing down, the controller may activate a regeneration step. This step may comprise engaging the motor as a generator and providing a bias for more efficient regeneration. The controller additionally may sense the motor shaft speed, actual deceleration rate and brake pressure, and adjust bias to obtain a more efficient recapture of energy.

Figure 4:
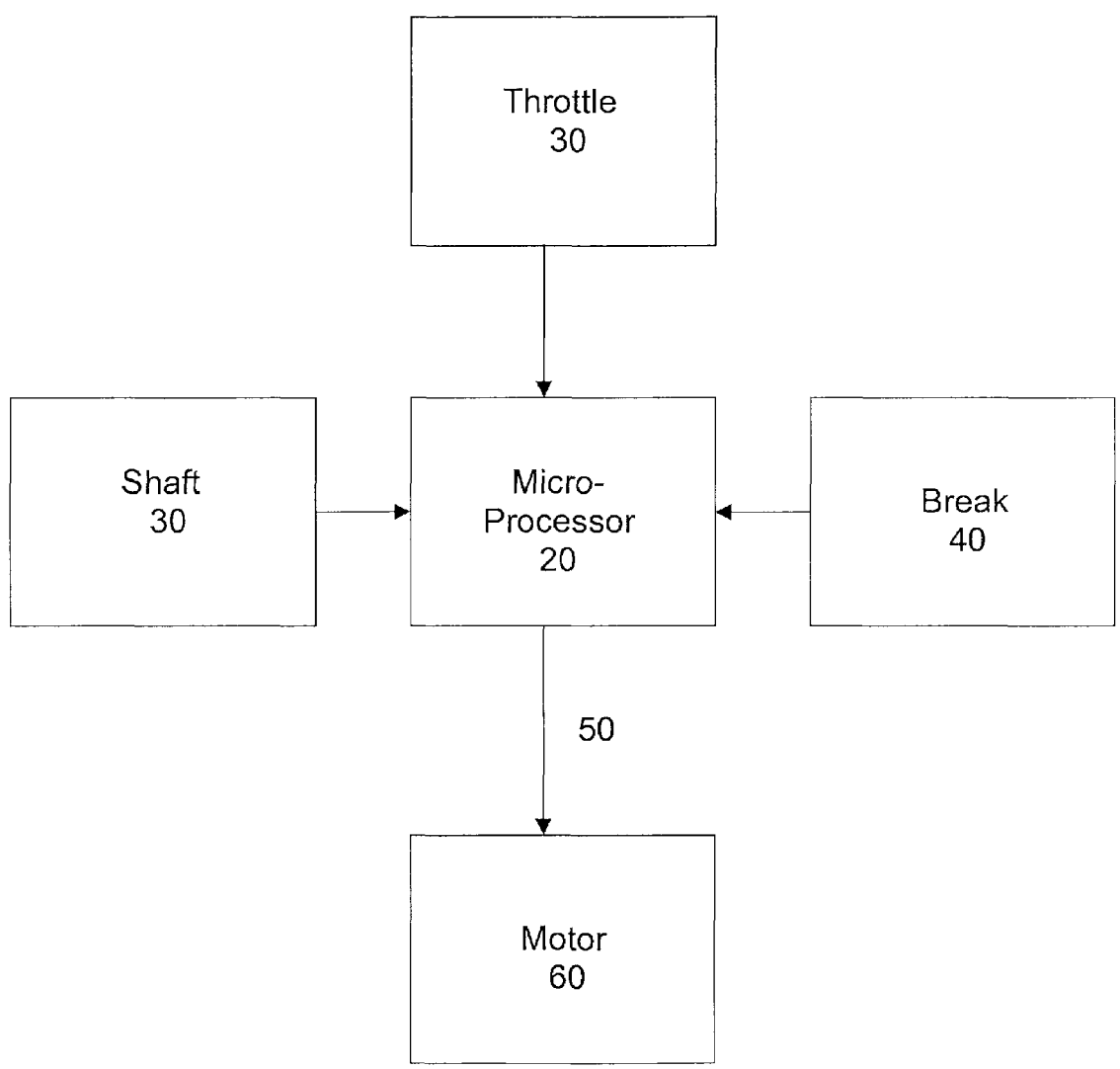
FIG. 4 shows an embodiment for terrestrial vehicle use.

A system comprising a controller with input(s) and output(s), and a controlled bias motor can be built and sold as a propulsion unit kit for modifying existing vehicles such as watercraft, golf carts, cars and buses. For example, FIG. 4 depicts a representative diagram, for implementing an embodiment of the invention in a golf cart, SUV, automobile or truck. This figure shows a motor shaft speed input signal 10 that informs microprocessor 20 of shaft speed and allows microprocessor 20 to detect a slowing by comparison of stored speed data values. Throttle input 30 also informs microprocessor 20 of intended slowing and brake 40 inputs a signal indicating a brake is needed. The microprocessor outputs a magnetic field modifying signal 50 for adjusting a field coil of motor 60 to tweak and thereby optimize the motor performance when used as a generator. At a low speed, a higher bias signal is provided to the motor than at higher speed, and at an optimum regeneration speed and load, no bias is supplied. Microprocessor 20 modifies the bias accordingly in response to detected shaft speed and load.

In an embodiment, brake signal 40 (which may indicate not only how much braking but also how fast the brakes are applied) is used to inform microprocessor 20 that a strong magnetic field is needed for a strong brake. That is, a magnetic field, such as a field surrounding the armature is increased in response to the "strong" braking signal. In an embodiment, a permanent magnet motor of a vehicle such as the type used by Toyota™ is used for regenerative braking and the motor has an added electromagnet coil that modifies a permanent magnet field for improved regeneration performance. In another embodiment, the vehicle is a golf cart, and a bias is provided to the motor upon detection of a brake signal.

Embodiments are particularly desirable for hybrid and/or fuel cell powered automobiles, trucks and buses that advantageously regenerate a direct (i.e. no transmission) electric drive from stopping or slowing motion. At high speeds, a biasing, current advantageously differs from biasing current at lower speeds. In an embodiment, a permanent magnet motor is used for driving a wheel, but an electromagnet superimposed on the permanent magnetic field provides adjustment of a composite magnetic field as needed for improved efficiency of regeneration.

In another embodiment, a high frequency alternating current or pulsing direct current signal is provided to the motor, to help eliminate motor friction, while allowing regeneration of a direct current from the regenerating motor. In another embodiment, a frequency is chosen that is resonant with (sees high impedance) the motor/generator circuit or a component part of the motor. In another embodiment, the load on the regeneration motor is adjusted, for example, by use of a transmission, to improve efficiency of regeneration. In another embodiment, a pulse is providing at certain points of the motor/generator revolution cycle to help decrease friction. Such pulses may be applied at the same time as a regeneration current is formed. Of course, similar biasing may be used to increase motor resistance, particularly for high torque land vehicles for braking, by increasing the magnetic field of an armature, or the field around the armature.

Water Vehicle Applications

RMPS is particularly useful for propeller driven watercraft. In an embodiment, a propeller is used as a brake to slow the watercraft. For example, in an embodiment, a regeneration propulsion kit is provided where in a regular watercraft propeller such as a 40-50 foot sailboat with a 16-17 inch propeller is replaced with a larger (e.g. 18-19 inch) propeller and a control system for biasing a motor that drives the propeller. The recovered energy from propeller braking is converted into an electric form and typically stored in a battery, capacitor bank or other device for reuse in powering the same motor.

A large propeller surface area is desirable in an embodiment. For example, generally speaking, a 3 blade propeller works better than a 2 blade propeller and a 4 blade propeller is better than a 3 blade propeller for regeneration. Furthermore a higher pitch propeller generally provides more regeneration. An 18 inch 11 pitch propeller generally will regenerate less than an 18 inch 18 pitch propeller for a typical sailboat. Without wishing to be bound by any one theory of operation for this particular embodiment, it is pointed out that the sharper angle and greater surface area, or better shape for screwing through the water performs more efficaciously compared with a flatter pitched propeller that more easily spills water off its sides. Accordingly, an embodiment provides a kit that replaces a propeller and internal combustion motor with a larger surface area (and/or pitch) propeller and an electric motor/generator for regeneration electricity. In another embodiment, a kort nozzle is provided for enhanced regeneration efficiency. A regeneration kit accordingly may include a kort nozzle with a propeller matched to an electric motor/generator that regenerates energy as described here in.

In an embodiment, a propeller based system obtains energy from waves. The propeller can convert energy from traveling down a wave into a stored form useful for powering a motor. With out wishing to be bound by any one theory of this embodiment, it is pointed out that non-breaking waves such as those in deep water do not necessarily push an object in a direction of wave movement, but move an object floating on the wave, up and down. RMPS can capture some of this energy during watercraft transit of waves and swells. When the watercraft travels down a wave or swell, energy is produced by regeneration. Later, the watercraft is lifted up by travel of a successive wave or swells through the watercraft location. The process then can repeat itself.

RMPS for Wave Riding

Figure 5:
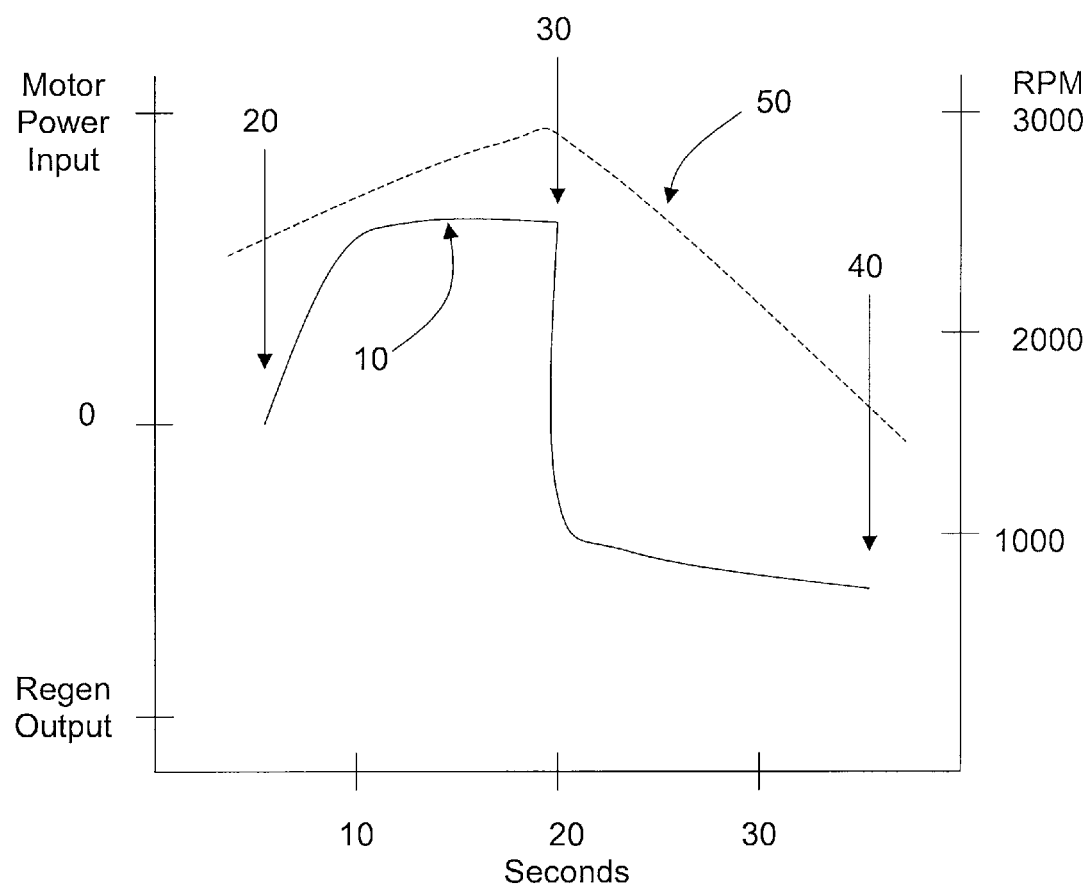
FIG. 5 shows an embodiment for watercraft wave riding.

FIG. 5 shows a representative diagram of motor/generator power output/input shown as a first y axis on the left, with time, shown as the x axis and with motor/generator shaft speed, shown as a second y axis on the right. Solid line plot 10 displays a representative motor/generator power transfer for a watercraft that alternately powers up a wave (from arrow 20 to arrow 30) and regenerator down a wave, (from arrow 30 to arrow 40) according to an embodiment. Arrow 30 indicates a time point of the wave crest, after which a descending wave allows regeneration while the watercraft descends. In this example, the watercraft is moving perpendicular to the wave.

According to an embodiment, the motor output at the region of the plateau on the right side of the line between arrow 20 and arrow 30 is controlled to a minimum motor/shaft speed for subsequent efficient regeneration. A controller may increase power, or shift gear (if available) to achieve a suitable motor/generator shaft speed at or near the left side of arrow 30. After arrow 30, regeneration begins and the shaft speed will depend on how much regeneration is desired and how big the wave is. Dashed line plot 50 displays a representative motor/generator shaft speed. The left side of plot 50 shows the rpm when the motor expends energy to increase watercraft speed during travel up a wave. The right side of plot 50 shows shaft speed during regeneration. In another embodiment the shaft speed increases from arrow point 30 to arrow point 40, as the watercraft picks up speed going down a wave. In an embodiment, the energy regenerated between arrows 30 and 40 is stored in a capacitor bank and soon released for the next powering up the following wave.

In another embodiment, a battery is charged by regeneration but is near capacity, so the motor/generator is biased with a weaker field to allow less energy regeneration and a faster rpm, so that the negative slope of dashed line 50 between arrows 30 and 40 is less. In the case of a big wave, the latter slope may even become positive, as the watercraft can pick up speed. In another embodiment, more regeneration energy is needed, a stronger bias (higher electrical current) is applied to one or more electromagnets of the motor/generator, and dashed line 40 is more steeply negative. In another embodiment, the biases are adjusted to achieve nearly complete (e.g. 80-100%, 85-95%, 90-100%, 95-100%) charging of a capacitor bank in a single charge cycle.

In practice, bias is adjusted depending on a given sailing or deceleration condition, as described here in. In an embodiment, bias is carried out solely by application of electric current to establish or modify magnetic field(s), but in another embodiment, a transmission may be used to assist the process of matching the motor/generator with a propeller. For example, when regeneration by traveling down a wave, a second (higher ratio) gear may be used. In yet another embodiment shown in FIG. 3, the bias 200 is carried out by adjusting the spacing between one or more magnets 220 with in the motor to decrease the elect magneto attraction (internal friction) of the motor and allow a higher rpm. For example, the controller 200 may alter one or more magnetic fields by adjusting the spacing between magnets 220 by controlling the at least one piezo electric device 222, solenoid device 224 and/or screw mechanism 226 that position two or more parts of the motor from each other.

As seen in FIG. 5, RMPS harvests a portion of wave energy by allowing a watercraft exposed to such wave motion, to travel down a wave, and thereby use some of the down wave travel force to move a propeller and regenerate energy. The watercraft is continuously moved up again by successive waves, so the potential energy presented at the top of wave to an RMPS system is continuously replenished by the wave action itself. A large amount of energy can be harvested from wave action this way over the courses of a long voyage. A watercraft with RMPS advantageously can extract energy from large waves and swells, particularly those that move the watercraft vertically by at least 0.5 times, 1 time, 2 times, 3 times, 4 times, 5 times, or more the submerged distance of the hull. By way of example, a watercraft having a submersion depth of 2 foot particularly can benefit from swells of at least 1 foot, 2 foot, 4 foot, 6 foot, 8 foot, 10 foot or more, respectively.

In practice, a watercraft operator manually may select regeneration timing, or an automated or semi-automated system may be used. A manual switch may be activated for each instance of regeneration. Desirably a monitor such as electrical current meter, a watt meter, a light to indicate battery charging and the like may be used to assist the manual operation. Semiautomatic operation may be used. In one such system, a watercraft operator selects a condition such as a minimum watercraft tilt angle (optionally with watercraft heading), minimum watercraft speed, motor (i.e. generator) shaft speed, change in rate of shaft speed, change in direction of shaft speed, status of sail, (such as the degree of billowing), minimum wave height, minimum wave transit speed, minimum wind speed, wind direction, and/or combination of these.

The selection may be based on a real time measurement. That is, at the beginning of a wave, the user activates a switch to inform the controller that the particular wave (or other condition) should be used as a trigger. The watercraft monitors the selected parameters(s) (generally from one or more sensors in real time) and implements regeneration when the selected parameter limit, combination of limits, or other combination of parameters is met. Similarly, one or more parameters, such as decrease in motor (generator) shaft speed below a certain value may be use to terminate the regeneration event and resume a prior or alternative conditions, such as continuing motor propulsion.

In an embodiment, when a given sailing or deceleration condition, such as a minimum, maximum or other parameter limit is met, a controller triggers a specific regeneration biasing condition and/or switching of a circuit such as a battery charging circuit. For example, a watercraft operator may decide to slow or stop a watercraft and actuates a control for a slower speed or for a stop. The control creates a signal that sets a given bias conditions to the motor for improved regeneration, and may turn on circuitry that sends regenerated electrical power into storage such as a storage battery. Of course, a skilled artisan can determine a suitable motor biasing condition from obtaining or calculating real life performance with a specific motor and watercraft or other vehicle. In an embodiment, the controller has a learning mode where in a user inputs parameters indirectly by selecting desired operating points during trial runs of a watercraft or land vehicle under real operating conditions. In another embodiment, the actual bias used, namely, the duration, amount, and quality (pulsing, varying, periodic, etc) advantageously may be further modified or set by consideration of additional factors such as present motor shaft speed, present watercraft speed, and the like.

A regeneration event, such as the harvesting of energy from slowing or stopping a vehicle, may be modified further by the quality of the desired event. For example, a rapid stop may call for a different biasing than a slow stop. A very fast stop may benefit from a very high reverse bias opposite to an existing magnetic field and may cause increased current commensurate with the need for higher magnetic field. A very slow stop may involve setting a weaker bias designed to create a given rate of deceleration. The bias may be changed, manually or automatically in response to information about the actual resulting speed. If the deceleration is too rapid, for example, a bias may be weakened to allow less regeneration.

Conversely, if deceleration is too slow, a bias may be increased to incur greater regeneration.

In another embodiment, the degree of charge in an energy storage device such as a battery, coiled spring, or flywheel, is monitored to control the application and/or type of biasing. For example, when a battery pack or capacitor bank that acquires electrical energy from RMPS is above a set value such as above 75%, 80%, 85%, 90%, 95%, 97%, 98%, 99%, 100% filled state, biasing may be altered for less regeneration or regeneration my be stopped entirely. Alternatively, when a battery pack or other energy reservoir is below such value, or below a lower value of, for example, 50%, 35%, 25%, 15%, 10%, 8%, 5%, 3%, and 2% or less, biasing may be set for maximum regeneration. A skilled artisan, based in this disclosure can determine a variety of conditions to optimize performance. For example, if a storm is approaching, a watercraft operator may reset a regeneration priority to a higher level to ensure that a more filled battery may be prepared in anticipation of greater energy need during the storm.

Virtually any power boat, such as a speedboat, displacement boat, hovercraft, submarine, or barge may benefit from RMPS and an RMPS system may be integrated with an auto pilot. For example, returning a throttle setting back to a neutral position may turn on regeneration via switching and biasing as needed. Deceleration from lowering a throttle setting likewise may turn on or increase regeneration until the water speed reaches maximum value, the watercraft stops, or after a period of time. Advantageously, the speed and corresponding regeneration depends on propeller size, speed of tidal flow (i.e. with or against the flow,) shaft and propeller position (degrees that a propeller shaft is and whether it is obscured by the hull) or sail or pod drive.

Biasing via Motor Speed Control

In an embodiment, a regeneration event is planned for by altering the rotational speed of a motor/generator in advance of the event to create more efficient conditions for regeneration. This may be useful, for example, when a motor operating as a generator requires a higher speed for better efficiency. Prior to shifting from motor propulsion to regeneration, the motor speed is adjusted up to allow a greater average rotational speed during the regeneration. An example of this embodiment is a watercraft that travels across waves and is represented in FIG. 5 as an increase in motor/shaft speed during travel up a wave. As the watercraft travels up a wave the propeller ration (and motor) speed may gradually drop. At the top of the wave, the motor may be switch into regeneration mode, but the shaft speed may be lower than that desired for efficient operation. In this embodiment, the motor is accelerated going up the wave so that a minimum speed desirable for regeneration is obtained when going down. Most desirable, when wave action is present, motor speed is increased to accelerate boat speed up a wave to provide additional shaft RPM at the motor, so that an even greater amount of regeneration will be generated when sliding down the wave. This allows exploitation if the inherent power that is in the wind and the velocity of the vessel as it slides down the wave. Such synergistic responses of the wind, waves, and RPMS can be optimized further by various schemes of motor biasing as described here in.

Speed control to improve regeneration may be combined with biasing for further efficiency improvement. Desirably, one or more automated sensing systems control the motor fro a minimum speed prior to initiating regeneration. In an embodiment, an adaptive learning program is used, that monitoring the cadence of the regeneration events adjusts motor speed, biasing, and/or both based on recent behavior.

An adaptive learning program stores one or more types of information including, motor speed changes with time, switching in to and out of regeneration with time, watercraft attitude, watercraft speed, wind speed, wave or swell height with time, wave or swell direction with respect to watercraft heading, and the like. For example, an automated, partly automated or manually operated control may initiate a regeneration event based on wave activity. The user may select a continuous running mode, where in the sequence of events is repeated. As the system acquires data, such as actual motor speed with respect to boat speed and boat attitude, the system may adjust timing for regeneration, biasing for regeneration, and/or propulsion motor speed for a more optimum result. For example, if the time duration of powering up a wave turns out to be too short the motor power may be increased accordingly. In an embodiment, a user may interrupt the continuous mode operation by manually initiating or terminating a regeneration event, timing an event or modifying bias.

Motor Control to Match Wind Conditions

A motor with regeneration provides an opportunity to help match wind conditions with boat speed and wave action to extract best performance from all three parameters. In one embodiment, motor power and/or regeneration are adjusted on a sailboat to help maintain sail tension (e.g. minimize left) for best system efficiency. In this case propulsion power, regeneration and/or heading are modified to help maintain speed. A sailboat speed with respect to wind when traveling down a wave differs from that when traveling up a wave. Without an RMPS system, the sailor literally may be left to the mercy of the wind, and at times the sail may not furl properly, causing lower efficiency. In an embodiment, the RMPS monitors this condition and provides power to the boat as needed while traveling up or down a wave to maintain a minimum sail tension and/or to prevent the sail from going slack.

Figure 6:
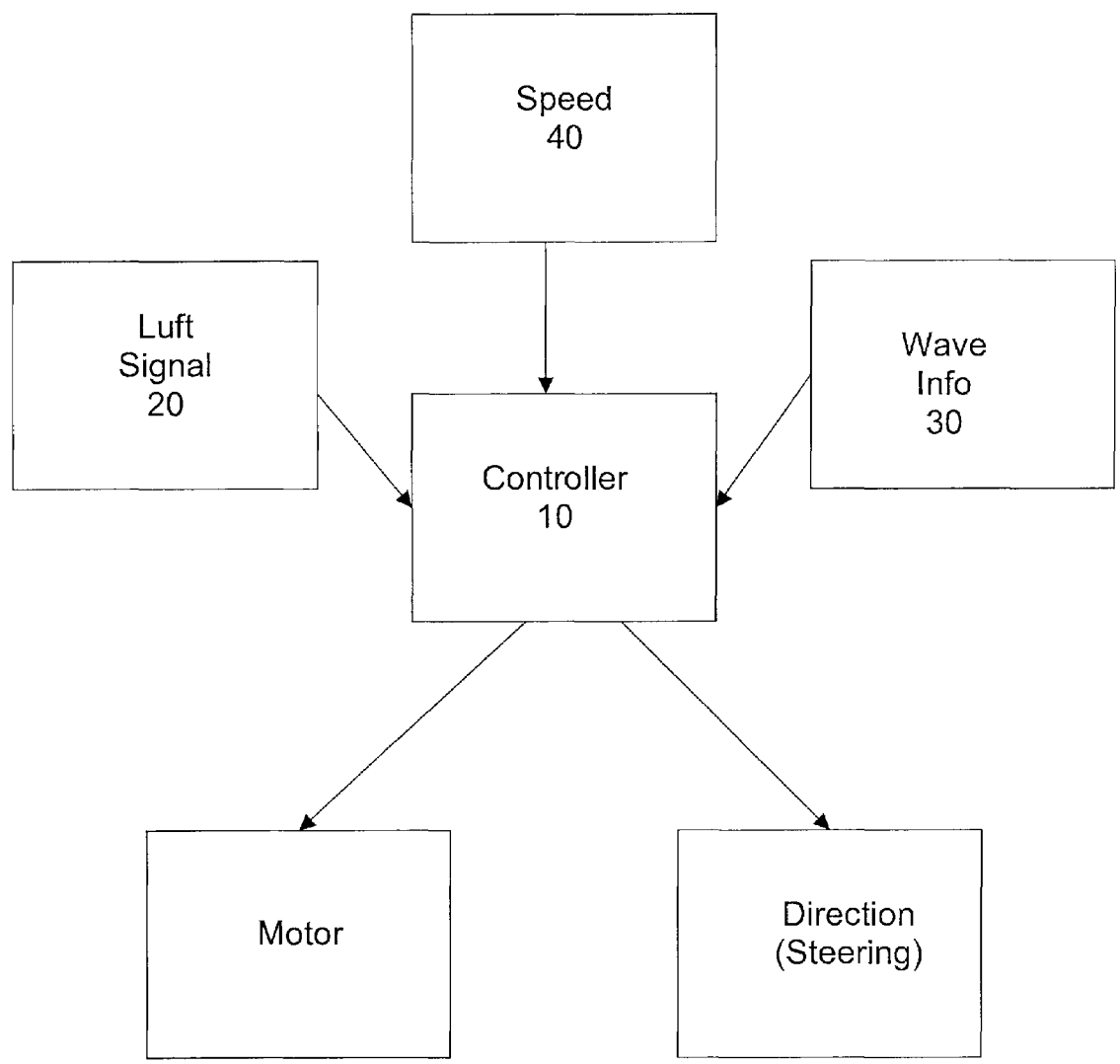
FIG. 6 shows an embodiment for responding to sail luft.

FIG. 6 depicts an RMPS system that responds not only to wave activity but also accounts for wind action on the sails of a watercraft. As seen in this figure, controller 10, which is a microcomputer, receives left signal 20, which may be generated piezoelectric ally by a 10 cm long plastic polymeric piezoelectric device imbedded within a sail, or may be generated optically by an infrared, ultraviolet, or visible light detector that reflects light from a furled sail, ultrasonically, by a sound transmitter and receiver, acoustically, from a sensor that monitors noise from the sail, or another means known to a skilled artisan.

Controller 10 optionally further receives wave information signal(s) 30, which informs the controller when up waves and down waves exists, so that the controller can apply motor power correspondingly. Controller 10 optionally receives motor signal 40, which may be motor power, motor speed, or both. Controller 10 compares this information via a stored program to determine whether motor power should be altered in response to left signal. In one embodiment, motor power is applied or increased by at least 10%, 20%, 30%, 40%, 50%, or more in order to increase boat speed to prevent a left signal. In another embodiment, the controller modifies a bias to the motor/controller by, for example, increasing bias current, to decrease regeneration and increase speed down a wave to minimize left. In an embodiment, a stored program records luft events and adjusts the amount of bias from a running average (average of most recent data). In another embodiment, a stored program senses a luft event, and in response resets a bias and/or increases motor power going up a wave down a wave or both. After the reset, the stored program optionally determines the effect on the luft signal. If the luft signal is diminished too little, a stronger response is made.

Embodiments may be implemented manually, but also can be carried out by automated sensing. In a semi automated mode embodiment, a vehicle operator signals a controller that an event has occurred. The controller then associates the sensory input with that event and reacts accordingly. For example, an operator may push a button indicating the need for regeneration down a wave. The controller determines sensory input corresponding in time with that manual signal and from that point forward, triggers a regeneration event (switch motor from output power to regeneration, applying a regeneration bias, or responding to a luft signal for example.) The controller continues operating the motor in the selected fashion until another manual instruction indicates otherwise.

Representative Bias Currents for a 10 Horsepower Motor

A desirable embodiment uses a Solomon Technologies Electric Wheel (TM) motor on a watercraft such as a sailing vessel or catamaran. It was found that the following amperage ranges may be applied to the motor, or to each motor when more than one motor/generator, is used. Generally the following data represent suggested bias for a single motor. However, in an embodiment a watercraft such as a catamaran uses at least two motors and regeneration amperage may be applied to one motor while another motor is employed to increase speed of the watercraft in lighter air with wave action.

It was found that regeneration in light air (i.e. 6 to 14 knots of wind) may benefit from the application of 0.2 to 2 amps of bias current. Regeneration in heavy air (i.e. 14 to 20 knots) may benefit from the application of 2 to 20 amps of bias current. Regeneration in light air of 14 to 20 knots in 3 to 4 foot seas benefited from 5 to 20 amps. Regeneration in heavy air of 20 to 40 knots in 4 to 14 foot seas benefited from the use of 15 to 40 amps with the electric wheel.

It was further found that in more than 40 knots of wind and greater than 10 foot seas, only minor biasing was necessary to increase regeneration. Maximum regeneration was obtained by setting the motor power level to achieve three quarters of boat hull speed. The optimum current for biasing will vary depending on hull and propeller configuration and can be determined by a killed artisan. In this regard, it is pointed out that motor/biasing current in an energy peak storing mode with wave action can be set to yield a net positive charge level, net zero charge level, or net negative change level.

As an example of motor/generator adjustment for a net charge level, a watercraft motoring up a 4 foot wave in 13 knots of wind using 10 amps of power, followed by sliding down the same wave regenerates about 15 amps of power, and yielding a net 5 amps for storage. In another example, a watercraft motoring up a 4 foot wave in 13 knots of wind using 15 amps of power, followed by sliding down the same wave regenerates about 15 amps of power, yielding no net current for storage. In yet another example, a watercraft motoring up a 4 foot wave in 13 knots of wind using 20 amps of power, followed by sliding down the same wave regenerates about 15 amps of power, and yielding a net 5 amps of consumption. In the first example, boat speed increases and energy is saved. In the second example, boat speed increases more, but energy is not saved. In the third example, boat speed increases yet more, but additional energy is consumed to provide the higher speed.

Each of these three examples provides specific performance that is affected by hull configuration and prop size/type. For example, a larger propeller in many cases will provide more regeneration and the more blades on the propeller generally provide more regeneration relative to a given wind and speed and sea condition. A two blade propeller was found to regenerate very little. A three blade propeller was better and a four blade propeller provided even better results. Further more, it was found that increasing the propeller pitch provided improved results. An 18 inch 11 pitch propeller was seen to regenerate less than an 18 inch 18 pitch propeller. A skilled artisan, armed with this information, may derive an optimum propeller pitch and size for a given regeneration situation by routine experimentation. Other combinations of the inventive features described above, of course easily can b determined by a skilled artisan after having read this specification, and are included in the spirit and scope of the claimed invention. References cited above are specifically incorporated in their entireties by reference and represent art know to the skilled artisan.

The invention claimed is:

1. A vehicle or watercraft regeneration system, comprising:
   at least one electric motor on a vehicle or watercraft which is capable of generating electricity; and
   a controller for the at least one electric motor, the controller:
   a) sensing current operating conditions of the at least one electric motor;
   b) accepting real-time data from a sensor relating to the vehicle or watercraft's status; and
   c) applying an algorithm to (a) and (b) to trigger a switching of the at least one electric motor from motoring to generating electricity and to generate a biasing signal for application to the at least one electric motor during the switching,
   wherein the biasing signal is effective to place the at least one electric motor in an optimized condition for generating electricity to optimize the efficiency of regeneration.

2. The vehicle or watercraft regeneration system of claim 1, wherein the controller further comprises controller circuitry configured to generate a biasing signal effective to bias the at least one electric motor by adjusting one or more electromagnetic fields.

3. The vehicle or watercraft regeneration system of claim 2, wherein the biasing signal comprises an electromagnetic pulse of less than 1 second duration.

4. The vehicle or watercraft regeneration system of claim 2, wherein the biasing signal increases the rotational speed of the at least one electric motor while the at least one electric motor is acting as a motor and before the controller switches the at least one electric motor to a regeneration mode.

5. The vehicle or watercraft regeneration system of claim 1, further comprising a manual input that allows a user to switch the controller on or modify its operation.

6. The vehicle or watercraft regeneration system of claim 1, further comprising an electricity storage device selected from a group consisting of a battery, a capacitor, an electrolysis unit that generates hydrogen from water, and a flywheel.

7. The vehicle or watercraft regeneration system of claim 1, wherein the real-time data from a sensor relating to the vehicle or watercraft's status is selected from a group consisting of a deceleration signal, an acceleration signal, a tilt signal, a speed signal, a change in speed signal, a tilt or attitude signal, a signal corresponding to sail luft, a signal corresponding to wind activity, a signal corresponding to vehicle wheel slip, a signal corresponding to wave activity, a signal corresponding to propeller slip, a signal corresponding to the depletion state of a stored power supply, signal corresponding to back EMF voltage of a motor, and a signal corresponding to the amount of total stored power.

8. The vehicle or watercraft regeneration system of claim 1, wherein the controller biases the at least one electric motor to achieve a minimum rpm prior to a regeneration event.

9. A vehicle or watercraft regeneration system as described in claim 8, wherein the biasing signal increases the at least one electric motor rpm by at least 10% prior to a regeneration event.

10. A vehicle or watercraft regeneration system as described in claim 1, wherein the controller biases the at least one electric motor to decrease motor internal resistance to rotation.

11. A vehicle or watercraft regeneration system as described in claim 10, wherein the controller biases the at least one electric motor by pulsing the at least one electric motor.

12. A watercraft comprising the regeneration system of claim 1.

13. A terrestrial vehicle comprising the regeneration system of claim 1.

14. A flying vehicle comprising the regeneration system of claim 1.

15. A method for enhancing the efficiency of a watercraft or vehicle, comprising:
   providing at least one electric motor capable of generating electricity;
   providing a controller for the at least one electric motor;
   sensing by the controller of current operating conditions of the at least one electric motor;
   accepting by the controller of real-time data from a sensor relating to the watercraft or Vehicle's status;
   applying an algorithm by the controller to the current operating conditions and the real-time data relating to the status of the motor to trigger a switching of the at least one electric motor from motoring to generating electricity; and
   generating a biasing signal by the controller for application to the at least one electric motor during the switching,
   wherein the biasing signal adjusts one or more magnetic fields of the at least one electric motor during regeneration to optimize the efficiency of the regeneration.

16. The method of claim 15, wherein the at least one electric motor is a permanent magnet motor and the method further includes the controller generating a biasing signal to adjust one or more electromagnetic fields that combine with the field of the permanent magnet motor.

17. The method of claim 15, further comprising the controller generating a biasing signal to adjust the one or more magnetic fields by adjusting the spacing between magnets by controlling at least one piezo electric device, solenoid device and/or screw mechanism.

18. The method of claim 15, wherein the real-time data from a sensor relating to the watercraft or vehicle's status is selected from a group consisting of: a throttle movement; release of a throttle; activation of a brake; activation of a speed control lever or switch; electrical power loss; decrease in available electrical power; a battery status signal; a change in battery status; a change in fuel cell status; a status or change in status of a fuel cell chemical power reservoir; a temperature or change in temperature; a motor speed or change in motor speed; a generator speed or change in generator speed; a change in motor/generator speed; an attitude indicator or change in attitude indicator; an elevation or change in elevation; a vehicle speed or change in vehicle speed; a wind speed or change in wind speed; a wave speed, change in wave speed; a wave direction or change in wave direction; a wind direction nor change in wind direction; a deceleration or acceleration signal; an electrical signal input by a user; a computer output obtained from operation of a stored program; a piezoelectric generated signal; a distance indication; a light indicator; a sound indicator; a vibration indicator; a motor or generator or motor/generator efficiency measurement or calculation; and/or a radio signal.

19. A kit for converting a watercraft or land vehicle to regeneration, comprising the drive system components recited in the method of claim 15, a package to contain the drive system components, and instructions for use of the drive components.

* * * * *

UNITED STATES PATENT AND TRADEMARK OFFICE
CERTIFICATE OF CORRECTION

PATENT NO. : 7,482,767 B2 Page 1 of 1
APPLICATION NO. : 11/046533
DATED : January 27, 2009
INVENTOR(S) : David Eugene Tether It is certified that error appears in the above-identified patent and that said Letters Patent is hereby corrected as shown below:

In the Claims:

At column 19, line 30, in claim 15, change "Vehicle's" to vehicle's.

Signed and Sealed this

Nineteenth Day of May, 2009

JOHN DOLL
*Acting Director of the United States Patent and Trademark Office*